(12) United States Patent
Koripelly et al.

(10) Patent No.: US 12,291,493 B2
(45) Date of Patent: May 6, 2025

(54) ORGANIC CHELATED ZINC COATED FERTILIZER FOR BETTER CROPS AND SOIL HEALTH

(71) Applicant: SABIC AGRI-NUTRIENTS COMPANY, Jubail (SA)

(72) Inventors: Rajamalleswaramma Koripelly, Bangalore (IN); Satish Burla, Bangalore (IN); Samik Gupta, Bangalore (IN)

(73) Assignee: SABIC AGRI-NUTRIENTS COMPANY, Jubail (SA)

( * ) Notice: Subject to any disclaimer, the term of this patent is extended or adjusted under 35 U.S.C. 154(b) by 915 days.

(21) Appl. No.: 17/312,095

(22) PCT Filed: Dec. 9, 2019

(86) PCT No.: PCT/IB2019/060571
§ 371 (c)(1),
(2) Date: Jun. 9, 2021

(87) PCT Pub. No.: WO2020/121164
PCT Pub. Date: Jun. 18, 2020

(65) Prior Publication Data
US 2022/0024834 A1    Jan. 27, 2022

Related U.S. Application Data

(60) Provisional application No. 62/777,966, filed on Dec. 11, 2018.

(51) Int. Cl.
*C05G 1/00*  (2006.01)
*C05C 9/00*  (2006.01)
(Continued)

(52) U.S. Cl.
CPC ............... *C05G 1/00* (2013.01); *C05C 9/005* (2013.01); *C05F 11/00* (2013.01); *C05G 5/35* (2020.02); *A01C 21/00* (2013.01)

(58) Field of Classification Search
CPC .... C05G 1/00; C05G 5/35; C05G 5/30; C05C 9/005; C05F 11/00; A01C 21/00; C05D 9/02
See application file for complete search history.

(56) References Cited

U.S. PATENT DOCUMENTS 3,423,199 A    1/1969   Philen et al.
3,617,239 A    11/1971  Klanica et al.
(Continued)

FOREIGN PATENT DOCUMENTS

AU    4557696    9/1996
AU     692665    6/1998
(Continued)

OTHER PUBLICATIONS

Cornell University. "Urea Fertilizer" Agronomy Fact Sheet Series. Fact Sheet 80 (2013) (Year: 2013).*
(Continued)

*Primary Examiner* — Jennifer A Smith
(74) *Attorney, Agent, or Firm* — Norton Rose Fulbright US LLP

(57) ABSTRACT

Organic chelated zinc coated fertilizer core, methods for their use, and production thereof, are disclosed. The organic chelated zinc coating can contain 0.02 wt. % to 0.5 wt. % or more, based on the total weight of the coated fertilizer, of zinc from the organic chelated zinc. The coating can optionally contain or exclude a binder. An oil based coating can be at least partially positioned between the surface of the fertilizer core and the organic chelated zinc coating.

19 Claims, 1 Drawing Sheet

(51) Int. Cl.
   *C05F 11/00* (2006.01)
   *C05G 5/35* (2020.01)
   *A01C 21/00* (2006.01)

(56) References Cited

U.S. PATENT DOCUMENTS

| | | | |
|---|---|---|---|
| 3,941,578 | A | 3/1976 | Tucker et al. |
| 3,961,932 | A | 6/1976 | Miller |
| 4,565,564 | A | 1/1986 | Backlund |
| 6,830,603 | B2 | 12/2004 | Whitehurst et al. |
| 8,642,507 | B1 * | 2/2014 | Entry .................. C05D 9/02 504/188 |
| 2004/0031303 | A1 | 2/2004 | Whitehurst et al. |
| 2012/0017659 | A1 | 1/2012 | Pursell et al. |
| 2014/0102156 | A1 | 4/2014 | Pursell et al. |
| 2015/0376076 | A1 | 12/2015 | Ward et al. |
| 2016/0340265 | A1 | 11/2016 | Kanagalingam et al. |
| 2017/0044078 | A1 | 2/2017 | McLaughlin et al. |
| 2017/0253534 | A1 | 9/2017 | Pursell et al. |

FOREIGN PATENT DOCUMENTS

| | | |
|---|---|---|
| AU | 2015226280 | 9/2016 |
| CA | 2995400 | 2/2017 |
| CN | 1165801 | 11/1997 |
| CN | 1063166 C | 3/2001 |
| CN | 101503330 | 8/2009 |
| CN | 103695914 | 4/2014 |
| CN | 104016798 | 9/2014 |
| CN | 104163709 | 11/2014 |
| CN | 104250170 | 12/2014 |
| CN | 104447010 | 3/2015 |
| CN | 104892123 | 9/2015 |
| CN | 105036928 | 11/2015 |
| CN | 105036938 | 11/2015 |
| CN | 105418299 | 3/2016 |
| CN | 105712790 | 6/2016 |
| CN | 105837312 | 8/2016 |
| CN | 105859388 | 8/2016 |
| CN | 105906456 | 8/2016 |
| CN | 106083327 | 11/2016 |
| CN | 106116949 | 11/2016 |
| CN | 106458779 | 2/2017 |
| CN | 106518463 | 3/2017 |
| CN | 106631271 | 5/2017 |
| CN | 105036983 B | 1/2018 |
| CN | 108503432 | 9/2018 |
| CN | 108530231 | 9/2018 |
| CN | 108558494 | 9/2018 |
| DE | 3902848 A1 * | 8/1990 |
| EP | 3429347 | 1/2019 |
| FR | 32983 A | 3/2013 |
| IN | 262879 | 10/2005 |
| IN | 20050279211 | 6/2009 |
| IN | 201202875 P2 | 6/2013 |
| IN | 201617029700 | 6/2019 |
| IN | 2875 | 6/2020 |
| JP | H10291882 A * | 11/1998 |
| WO | WO 2011/080764 | 7/2011 |
| WO | WO 2015/017329 | 2/2015 |
| WO | WO 2015/145221 | 10/2015 |
| WO | WO 2017/178342 | 10/2017 |

OTHER PUBLICATIONS

Alvarez, et al. "Effects of chelated zinc, soluble and coated fertilizers, on soil zinc status and zinc nutrition of maize," *Communications in Soil Science and Plant Analysis*, 1996, 27(1-2):7-19. Effects of chelated zinc, soluble and coated fertilizers, on soil zinc status and zinc nutrition of maize: Communications in Soil Science and Plant Analysis: vol. 27, No. 1-2 (tandfonline.com).

International Search Report and Written Opinion issued in PCT/IB2019/060571, dated Mar. 2, 2020.

International Search Report and Written Opinion issued in PCT/IB2021/052640, dated Jun. 11, 2021.

Irfan, et al. "Synthesis and characterization of zinc-coated urea fertilizer," *Journal of Plant Nutrition*, 2018, 41(13): 1625-1635. Synthesis and characterization of zinc-coated urea fertilizer: Journal of Plant Nutrition: vol. 41, No 13 (tandfonline.com).

Milani, et al. "Dissolution kinetics of macronutrient fertilizers coated with manufactured zinc oxide nanoparticles," *Journal of Agricultural and Food Chemistry*, 2012, 60(16):3991-3998. Dissolution Kinetics of Macronutrient Fertilizers Coated with Manufactured Zinc Oxide Nanoparticles | Journal of Agricultural and Food Chemistry (acs.org).

Abdullah, B. et al., "Role of zinc-coated urea fertilizers in improving nitrogen use efficiency, soil nutritional status, and nutrient use efficiency of test crops", *Frontiers in Environmental Science*, 1-14, 2022.

Office Action issued in corresponding Chinese Application No. 202180029541.5, dated Sep. 29, 2023. (English Translation Provided).

Rico, MI et al., "Preparation of Fertilizers with Rosin and Tricalcium Phosphate Coated Zinc Chelates. Laboratory Characterization", *J. Agric. Food Chem*, 2758-2761, 1995.

Shivay, YS et al., "Relative yield and zinc uptake by rice from zinc sulphate and zinc oxide coating onto urea", *Nutr Cycl Agroecosyst*, 181-188, 2007.

Examination Report issued in corresponding Saudi Arabian Application No. 521422237, dated Feb. 11, 2025.

* cited by examiner

ORGANIC CHELATED ZINC COATED FERTILIZER FOR BETTER CROPS AND SOIL HEALTH

CROSS REFERENCE TO RELATED PATENT APPLICATIONS

This application is a national phase application under 35 U.S.C. § 371 of International Application No. PCT/IB2019/060571, filed Dec. 9, 2019, which claims priority to and the benefit of U.S. Provisional Application No. 62/777,966, filed Dec. 11, 2018, the entire contents of each of which are incorporated into the present application in their entirety.

BACKGROUND OF THE INVENTION

A. Field of the Invention

The invention generally concerns an organic chelated zinc coated fertilizer. Such a coated fertilizer can have improved properties that can be beneficial for the agricultural industry, contribute towards sustainability through better soil health, increase nutrient uptake, and increase crop yield.

B. Description of Related Art

Soil nutrients, such as nitrogen, phosphorus, potassium, and sulfur, as well as trace elements such as iron, zinc, copper, and magnesium, are useful for achieving thriving agriculture and growth of plants. Upon repeated planting cycles, the quantity of these nutrients in the soil may be depleted, resulting in inhibited plant growth and decreased production. To counter this effect, fertilizers have been developed to help replace the depleted vital nutrients and to create the right balance of nutrients.

Farmers often overlook the importance of secondary nutrients and micronutrients. Among the micronutrients, zinc (Zn) has emerged as one of the most deficient nutrients in most soils. Zinc deficiency causes reduced yield, impaired quality, poor growth, poor tillering, shorter internode length, interveinal chlorosis, stunting, and/or bronzing in plants.

In the past, zinc has been supplied to plants as a fertilizer by application to the soil, foliar application, dusting of seeds with Zn powder or soaking them in Zn solutions, and dipping roots of transplanted crops in solutions or suspensions of Zn salts. Of these, soil application and foliar spray are among the most extensively used. Soil application of Zn is prophylactic while foliar sprays are typically for therapeutic treatment. Soil application of Zn to annual crops is a preferred method over foliar sprays.

Most applications of Zn to plants or soils use inorganic based zinc, such as ZnO, $ZnSO_4$, $Zn(NO_3)_2$, or Zn salts (U.S. Pat. Nos. 4,565,564, 3,941,578, 3,617,239, AU 2015226280, CN 1165801(A), IN 262879(B), IN 201617029700(A), IN 2875KON2012(A), CN 104447010 (A), CN 103695914(A)). Some have used Zn complexes in fertilizers (U.S. Pat. No. 6,830,603, WO 2015/017329, AU 4557696, IN 262879(B)). Further, some have used organic chelated zinc as a source of zinc in a core of a coated fertilizer or throughout a fertilizer granule (CN 106518463 (A), CN 105859388(A), CN 105837312(A), CN 105418299 (A), CN 104892123(A), CN 104016798(A), CN 106631271 (A), US 2017/0253534). Some have used aqueous based slurries or solutions to coat organic chelated zinc onto a fertilizer core (U.S. Pat. No. 3,961,932) or acids to increase the solubility of zinc in the fertilizer (CA 2995400(A)). Foliar sprays or fertigation solutions can contain zinc-ethylenediaminetetraacetate Zn-EDTA for therapeutic treatment of plants (WO 2017178342, CN 105906456(A)). However, solid fertilizers containing organic chelated zinc typically contain low amounts of Zn and liquid fertilizers can be difficult and costly to transport.

Improved fertilizers that reduce cost, complexity, transport difficulties, and application burdens are still needed.

SUMMARY OF THE INVENTION

A solution has been discovered to at least some of the aforementioned problems associated with currently available fertilizers. The solution is premised on the development of a coated fertilizer having 1) a fertilizer core containing a urea-based fertilizer and 2) a coating containing an organic chelated zinc. The coated fertilizer has desirable physical, chemical, and/or plant growth properties and can be produced, transported, and applied in a less complex, less costly, and more convenient manner when compared with the currently available fertilizers. Further, the coated fertilizer can contain high concentrations of nitrogen (e.g., up to 46 wt. %) or zinc (e.g., up to 2 wt. %), or a combination thereof. These nutrients can be provided in a single application by using the coated fertilizers described herein. The zinc of the organic chelated zinc used in the present invention can be more readily available to a plant than zinc of inorganic zinc compounds. Not to be bound by theory, it is believed that zinc in organic chelated zinc is immediately available to a plant, while inorganic zinc may chelate with phosphates in the soil, rendering the phosphate chelated inorganic zinc unavailable to a plant. The coated fertilizers disclosed herein can provide better soil/rhizosphere health, better crop yield, better plant health, and/or better uptake of soil-bound nutrients.

In one aspect of the present invention, a coated fertilizer is disclosed. The coated fertilizer can contain a coating containing an organic chelated zinc at least partially covering the surface of a fertilizer core containing a urea-based fertilizer. The core can contain at least 50, 60, 70, 80, 90, 91, 92, 93, 94, 95, 96, 97, 98, or 99 wt. % based on the total weight of the core, including all ranges and subranges there between, of the urea-based fertilizer. In some aspects, the urea-based fertilizer is urea. In some instances, the core can consist essential of or consist of the urea-based fertilizer. In some instances, the core can consist essentially of or consist of urea.

At least a portion of the core's surface can be in direct contact with the coating containing an organic chelated zinc. The coating containing an organic chelated zinc can be a powder, dried, or dry coating. The coating containing the organic chelated zinc can, in some instances, be an oil based coating or can be an aqueous based coating. In some instances, the organic chelated zinc coating does not contain inorganic zinc, non-ionized zinc metal, or an acid other than any organic chelated zinc contained therein. The organic chelated zinc coating can be 0.001 wt. % to 10 wt. %, 0.001 wt. % to 9 wt. %, 0.001 wt. % to 8 wt. %, 0.001 wt. % to 7 wt. %, 0.001 wt. % to 6 wt. %, 0.01 wt. % to 10 wt. %, 0.1 wt. % to 10 wt. %, 0.5 wt. % to 10 wt. %, 0.5 wt. % to 9 wt. %, 0.5 wt. % to 8 wt. %, 0.5 wt. % to 7 wt. %, 0.5 wt. % to 6 wt. %, 1 wt. % to 6 wt. %, or any range therein, of the coated fertilizer based on the total weight of the coated fertilizer.

The organic chelated zinc can be any organic chelated zinc. In some instances, the organic chelated zinc is zinc-ethylenediaminetetraacetate (Zn-EDTA). The organic chelated zinc in the organic chelated zinc coating can be an organic chelated zinc particle. Organic chelated zinc particles can have a mean average diameter greater than 10 microns, greater than 20 microns, greater than 30 microns, greater than 40 microns, greater than 50 microns, greater than 60 microns, greater than 70 microns, greater than 80 microns, greater than 90 microns, or greater than 100 microns. In some instances, the organic chelated zinc particles have a mean average diameter of 10 to 350 microns. In some instances, the organic chelated zinc particles have a mean average diameter of 10 to 350 microns, 20 to 350 microns, 30 to 350 microns, 40 to 350 microns, 50 to 350 microns, 60 to 350 microns, 70 to 350 microns, 80 to 350 microns, 90 to 350 microns, 100 to 350 microns, 120 to 350 microns, 50 to 300 microns, 50 to 250 microns, 50 to 200 microns, 80 to 300 microns, 90 to 300 microns, 100 to 300 microns, 80 to 200 microns, 90 to 200 microns, 100 to 200 microns, or any range or size therein.

The coated fertilizer can contain 0.02 wt. % to 0.5 wt. % of zinc from the organic chelated zinc relative to the total weight of the coated fertilizer. The coated fertilizer can contain 0.02 wt. % to 0.5 wt. %, 0.02 wt. % to 0.4 wt. %, 0.02 wt. % to 0.3 wt. %, 0.02 wt. % to 0.2 wt. %, 0.1 wt. % to 0.5 wt. %, 0.1 wt. % to 0.4 wt. %, 0.1 wt. % to 0.3 wt. %, 0.1 wt. % to 0.2 wt. %, or any range therein, of the zinc from the organic chelated zinc relative to the total weight of the coated fertilizer.

In some instances the organic chelated zinc coating optionally contains or excludes one or more of one or more colorant(s), water, one or more solubilizing agent(s), one or more binder(s), and/or one or more anticaking agent(s). In some instances, the organic chelated zinc coating contains one or more colorant at a weight ratio of 0.5:1 to 6:1 to the organic chelated zinc. The weight ratio of binder to organic chelated zinc can be 0.5:1 to 6:1, 1:1 to 6:1, 1:1 to 5:1, 1:1 to 4:1, 1:1 to 3:1, 1:1 to 2:1, 2:1 to 6:1, 3:1 to 6:1, 4:1 to 6:1, 5:1 to 6:1, 0.5:1 to 5:1, or 0.5:1 to 4:1, or any range therein. The colorant can be an aqueous based colorant or an oil based colorant. In some instances, the colorant can be or can be obtained from chlorophyll, indigo, turmeric, logwood, madder, woad, saffron, tyrian purple, lac, murex snail, octopus ink, cuttlefish ink, catechu, gamboge tree resin, *Himalayan rubhada* root, kamala, larkspur, pomegranate, etc. In some instances, the colorant is indigo and/or turmeric.

In some instances, the organic chelated zinc coating contains one or more binder at a weight ratio of 0.5:1 to 6:1 to the organic chelated zinc. The weight ratio of binder to organic chelated zinc can be 0.5:1 to 6:1, 1:1 to 6:1, 1:1 to 5:1, 1:1 to 4:1, 1:1 to 3:1, 1:1 to 2:1, 2:1 to 6:1, 3:1 to 6:1, 4:1 to 6:1, 5:1 to 6:1, 0.5:1 to 5:1, or 0.5:1 to 4:1, or any range therein. In some instances, the organic chelated zinc coating contains one or more solubilizing agent(s) at a weight ratio of 0.5:1 to 6:1 to the organic chelated zinc. The weight ratio of solubilizing agent(s) to organic chelated zinc can be 0.5:1 to 6:1, 1:1 to 6:1, 1:1 to 5:1, 1:1 to 4:1, 1:1 to 3:1, 1:1 to 2:1, 2:1 to 6:1, 3:1 to 6:1, 4:1 to 6:1, 5:1 to 6:1, 0.5:1 to 5:1, or 0.5:1 to 4:1, or any range therein. In some instances, the organic chelated zinc coating contains one or more anticaking agent(s) at a weight ratio of 0.5:1 to 6:1 to the organic chelated zinc. The weight ratio of anticaking agent(s) to organic chelated zinc can be 0.5:1 to 6:1, 1:1 to 6:1, 1:1 to 5:1, 1:1 to 4:1, 1:1 to 3:1, 1:1 to 2:1, 2:1 to 6:1, 3:1 to 6:1, 4:1 to 6:1, 5:1 to 6:1, 0.5:1 to 5:1, or 0.5:1 to 4:1, or any range therein.

In some instances the coated fertilizer optionally contains or excludes one or more additional coatings. The additional coatings can, in some instances, contain an organic chelated zinc, one or more binder(s), one or more colorant(s), and/or one or more anticaking agent(s). In some instances, the water contained in one or more of the coatings can be less than 2% by weight of the coating. In some instances, the water content is 2 wt. %, 1.5 wt. %, 1 wt. %, 0.5 wt. %, or less, compared to the weight of the coating. The coated fertilizer can optionally contain an oil based coating. The oil based coating can, in some instances, be at least partially positioned between the surface of the fertilizer core and the coating containing the organic chelated zinc. The oil based coating can contain a fertilizer suitable oil. The oil based coating can contain linseed oil, castor oil, palm oil, mustard oil, paraffin oil, rapeseed oil, cottonseed oil, a vegetable oil, or combinations thereof.

In some aspects, the organic chelated zinc coating is not dispersed throughout the fertilizer core. In some instances, the organic chelated zinc coating forms a shell at least partially coating the core. In some instances, the organic chelated zinc coating is continuous or substantially continuous. In some instances, the organic chelated zinc coating is a powder coating. In some instances, the organic chelated zinc coating is formed by dispersed droplets that may partially or may not form a continuous coating. The organic chelated zinc coating can coat at least 50%, 70%, or 90%, or more of the surface of the core. In some instances, the coating of a plurality of coated fertilizer particles of the present invention has a mean average thickness of 2 to 350 microns, 2 to 50 microns, 2 to 40 microns, 5 to 50 microns, 5 to 40 microns, 10 to 50 microns, 10 to 40 microns, 50 to 350 microns, 60 to 350 microns, 70 to 350 microns, 80 to 350 microns, 90 to 350 microns, 100 to 350 microns, 120 to 350 microns, 50 to 300 microns, 50 to 250 microns, 50 to 200 microns, 80 to 300 microns, 90 to 300 microns, 100 to 300 microns, 80 to 200 microns, 90 to 200 microns, 100 to 200 microns, or any range or size therein.

The coated fertilizer can contain or exclude additional ingredients. The additional ingredients included or excluded can be a preservative, insecticide, fungicide, fragrance, micronutrient, fertilizer, plant growth agent, nutrient, secondary nutrient, trace element, plant protection agent, filler, colorant, etc., or a combination thereof. In some instances, the organic chelated zinc coating does not contain an additional ingredient (e.g., consists of organic chelated zinc).

The coated fertilizer of the present invention can contain the components therein and/or the above referenced additional ingredients therein at any concentration, ratio, percent by weight, percent by volume, etc. In some instances, the coating composition contains the components therein and/or the above referenced additional ingredients therein at 0.001 wt. %, 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. %, 100 wt. %, or any concentration or range therein, of the coating composition based on the total weight of the coating composition.

Also disclosed in the context of the present invention is a method of producing a coated fertilizer disclosed herein. The method can include contacting the core disclosed herein with a coating composition under conditions sufficient to form a coated fertilizer, wherein the coating composition contains an organic chelated zinc. Contacting the core with the coating composition can be achieved in part by spraying a liquid comprising the coating composition onto the core. The method can include a step of drying the coating composition in contact with the core. In some instances the drying step is performed at temperatures less than 100° C., at or less than 90° C., at or less than 80° C., less than the melting temperature of the fertilizer core, less than the melting temperature of the coating, less than the melting temperature of the urea-based fertilizer, and/or less than the melting temperature of urea. The method can include a step of heating the coating composition and/or the core before contacting the core with the coating composition. The coated fertilizer produced can be any of the coated fertilizers of the invention disclosed herein. The coating composition can produce the coating disclosed herein on the core disclosed herein when dried. The method can optionally include a step of coating the fertilizer core with an oil based coating before coating with the organic chelated zinc coating composition. The organic chelated zinc can be a powder, can be in an oil, or can be in an aqueous solution when the fertilizer core is contacted with the organic chelated zinc.

The coated fertilizer of the present invention can be included with other fertilizers in a fertilizer composition. In some instances, the coated fertilizer is contained in a blended fertilizer or a compounded fertilizer. By way of example, a blended fertilizer composition of the present invention can be formulated into a quick release fertilizer. Alternatively, the blended fertilizer composition can be formulated into a slow-release fertilizer. In some instances, the blended fertilizer composition is formulated into a specialty fertilizer.

In one aspect of the present invention, a method of producing a fertilizer blend is disclosed. The method can include combining the coated fertilizer disclosed herein with one or more additional fertilizer(s), secondary nutrient(s), trace element(s), plant protection agent(s), and/or filler(s).

In one aspect of the present invention, a method of fertilizing is disclosed. The method can include applying the coated fertilizer disclosed herein to at least one of a soil, an organism, a crop, a liquid carrier, a liquid solvent, or a combination thereof. Application of the coated fertilizer can promote plant growth and/or plant health.

Also disclosed are the following Aspects 1 to 20 of the present invention.

Aspect 1 is a coated fertilizer comprising: a fertilizer core comprising a urea-based fertilizer; and a coating comprising an organic chelated zinc that covers at least a portion of the surface of the fertilizer core, wherein the coated fertilizer comprises at least 0.02 wt. % to 0.5 wt. % of zinc from the organic chelated zinc relative to the total weight of the coated fertilizer.

Aspect 2 is the coated fertilizer of aspect 1, wherein the coated fertilizer comprises a colorant within the coating and optionally one or more non-aqueous binders.

Aspect 3 is the coated fertilizer of aspect 2, wherein the colorant is one or more of or can be obtained from one or more of chlorophyll, indigo, turmeric, logwood, madder, woad, saffron, tyrian purple, lac, murex snail, octopus ink, cuttlefish ink, catechu, gamboge tree resin, *Himalayan rubhada* root, kamala, larkspur, and pomegranate.

Aspect 4 is the coated fertilizer of any one of aspects 1 to 3, wherein the fertilizer core comprises 50 wt. % or more of a urea-based fertilizer relative to the total weight of the coated fertilizer.

Aspect 5 is the coated fertilizer of any one of aspects 1 to 4, wherein the fertilizer core consists of a urea-based fertilizer.

Aspect 6 is the coated fertilizer of any one of aspects 1 to 5, wherein the urea-based fertilizer is urea.

Aspect 7 is the coated fertilizer of any one of aspects 1 to 6, wherein the coating is in direct contact with the portion of the surface of the fertilizer core, and optionally wherein the coating is the only coating on the coated fertilizer.

Aspect 8 is the coated fertilizer of any one of aspects 1 to 7, wherein an oil based coating is at least partially positioned between the surface of the fertilizer core and the coating, and optionally wherein the oil-based coating and the coating are the only coatings on the coated fertilizer.

Aspect 9 is the coated fertilizer of aspect 8, wherein the oil based coating comprises linseed oil, castor oil, palm oil, mustard oil, paraffin oil, rapeseed oil, cottonseed oil, a vegetable oil, or combinations thereof.

Aspect 10 is the coated fertilizer of any one of aspects 1 to 9, wherein the coating is a powder coating comprising organic chelated zinc particles with a mean average diameter of 10 to 350 microns.

Aspect 11 is the coated fertilizer of any one of aspects 1 to 10, wherein the coating is a dried coating.

Aspect 12 is the coated fertilizer of any one of aspects 1 to 11, wherein the coating further comprises one or more binders.

Aspect 13 is the coated fertilizer of aspect 12, wherein the binder comprises an aqueous binder, and oil, and/or a solid additive.

Aspect 14 is the coated fertilizer of any one of aspects 12 to 13, wherein the weight ratio of the one or more binder to the organic chelated zinc is 1:1 to 6:1.

Aspect 15 is the coated fertilizer of any one of aspects 1 to 14, wherein the coated fertilizer comprises 0.02 wt. % to 0.20 wt. % of zinc from the organic chelated zinc relative to the total weight of the coated fertilizer.

Aspect 16 is the coated fertilizer of any one of aspects 1 to 15, wherein the organic chelated zinc is zinc chelated to an acid, preferably ethylenediaminetetraacetic acid.

Aspect 17 is the coated fertilizer of any one of aspects 1 to 16, wherein the coated fertilizer does not include inorganic zinc, non-ionized zinc metal, or an acid.

Aspect 18 is a fertilizer blend or a compounded fertilizer comprising the coated fertilizer of any one of aspects 1 to 17 and an additional fertilizer.

Aspect 19 is a method for producing a coated fertilizer of any one of aspects 1 to 17, the method comprising contacting a urea-based fertilizer core with: an organic chelated zinc coating composition comprising an organic chelated zinc and an aqueous liquid carrier under conditions sufficient to form a coating comprising the organic chelated zinc that is at least partially covering a surface of the fertilizer core; or an oil based coating composition under conditions sufficient to form an oil based coating that is at least partially covering a surface of the fertilizer core and thereafter contacting the oil based coating with an organic chelated zinc coating composition comprising an organic chelated zinc under conditions sufficient to form a coating comprising the organic zinc that is at least partially covering a surface of the oil based coating.

Aspect 20 is a method of fertilizing, the method comprising applying the coated fertilizer of any one of aspects 1 to 17 or the fertilizer blend or a compounded fertilizer of aspect 18 to at least one of a soil, a crop, or a soil and a crop.

The following includes definitions of various terms and phrases used throughout this specification.

The term "fertilizer" is defined as a material applied to soils or to plant tissues to supply one or more plant nutrients essential or beneficial to the growth of plants and/or stimulants or enhancers to increase or enhance plant growth. Non-limiting examples of fertilizers include materials having one or more of urea, ammonium nitrate, calcium ammonium nitrate, one or more superphosphates, binary NP fertilizers, binary NK fertilizers, binary PK fertilizers, NPK fertilizers, molybdenum, zinc, copper, boron, cobalt, and/or iron. In some aspects, fertilizers include agents that enhance plant growth and/or enhance the ability for a plant to receive the benefit of a fertilizer, such as, but not limited to biostimulants, urease inhibitors, and nitrification inhibitors. In some particular instances, the fertilizer is urea, such as urea granules.

The term "granule" can include a solid material. A granule can have a variety of different shapes, non-limiting examples of which include a spherical, a puck, an oval, a rod, an oblong, or a random shape.

The term "particle" can include a solid material less than a millimeter in its largest dimension.

The terms "particulate" or "powder" can include a plurality of particles.

The terms "aqueous based," "aqueous base," "water based," and "water base" are defined as containing water or was previously contained in water before drying.

The terms "oil based" and "oil base" are defined as containing a liquid oil or was previously contained in a liquid oil before drying.

The term "organic chelated zinc" refers to zinc that is chelated to an organic molecule, the organic molecule comprising carbon.

The term "inorganic zinc" refers to zinc that is not chemically bound or chelated to an organic molecule, the organic molecule comprising carbon. Non-limiting examples include Zn ions, non-ionic Zn metal, ZnO, ZnSO4, Zn(NO3)2, or Zn salts.

The terms "about," "approximately," and "substantially" are defined as being close to, as understood by one of ordinary skill in the art. In one non-limiting instance, the terms are defined to be within 10%, preferably, within 5%, more preferably, within 1%, and most preferably, within 0.5%.

The terms "wt. %," "vol. %," or "mol. %" refers to a weight, volume, or molar percentage of a component, respectively, based on the total weight, the total volume, or the total moles of material that includes the component. In a non-limiting example, 10 grams of a component in 100 grams of the material that includes the component is 10 wt. % of component.

The use of the words "a" or "an" when used in conjunction with any of the terms "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional unrecited elements or method steps.

The compositions and process of the present invention can "comprise," "consist essentially of," or "consist of" particular ingredients, components, compositions, etc., disclosed throughout the specification. With respect to the transitional phase "consisting essentially of," in one non-limiting aspect, a basic and novel characteristic of the coated fertilizer of the present invention is that the coated fertilizer contains a fertilizer core coated by an organic chelated zinc.

In preferred instances, the organic chelated zinc contains at least 0.02 wt. % to 0.5 wt. % zinc relative to the total weight of the coated fertilizer.

Other objects, features, and advantages of the present invention will become apparent from the following figures, detailed description, and examples. It should be understood that the figures, detailed description, and examples, while indicating specific embodiments of the invention, are given by way of illustration only and are not meant to be limiting. Additionally, it is contemplated that changes, combinations, and modifications within the spirit and scope of the invention will become apparent to those skilled in the art from this detailed description.

BRIEF DESCRIPTION OF THE DRAWINGS

Advantages of the present invention may become apparent to those skilled in the art with the benefit of the following non-limiting detailed description and upon reference to the accompanying non-limiting drawings. The drawings may not be to scale.

DETAILED DESCRIPTION OF THE INVENTION

Figure 1:
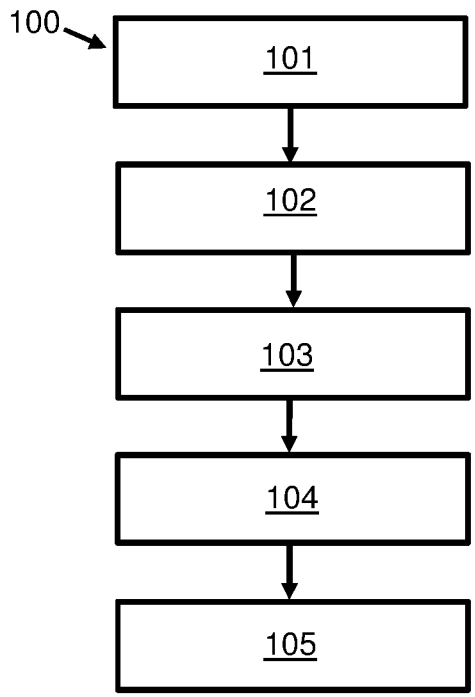
FIG. 1 is a schematic diagram depicting an exemplary method of producing a non-limiting embodiment of a coated fertilizer of the present invention.

The coated fertilizer of the present invention provides an elegant solution to problems associated with currently available fertilizers and zinc containing fertilizers. Notably, the coated fertilizer of the present invention has desirable physical, chemical, and/or plant growth properties and can be produced, transported, and applied in a less complex, less costly, and more convenient manner when compared to known fertilizers. Nitrogen and/or zinc can be provided in a single application by using the coated fertilizers described herein. The zinc of the organic chelated zinc in the present invention can be more readily available to a plant than the zinc of an inorganic zinc. Not to be bound by theory, it is believed that zinc in organic chelated zinc is immediately available to a plant, while inorganic zinc may chelate with phosphates in the soil, rendering the phosphate chelated inorganic zinc unavailable to a plant. The coated fertilizers disclosed herein can provide better soil/rhizosphere health, better crop yield, better plant health, and better uptake of soil-bound nutrients.

These and other non-limiting aspects of the present invention are discussed in further detail in the following sections with reference to the Figures.

A. Fertilizer Core with an Organic Chelated Zinc Containing Coating

1. Fertilizer Core

In some embodiments, the coated fertilizer of the present invention can include a fertilizer core containing a urea-based fertilizer. The urea-based fertilizer can be urea, a salt thereof, or an adduct thereof. The core can be a solid or semi solid at the time of coating the core or after coating the core, such as after drying the coated fertilizer.

In some embodiments, the core can contain at least 50 wt. % or more, based on the total weight of the core, of the urea-based fertilizer. The core can contain at least 55 wt. %, 60 wt. %, 65 wt. %, 70 wt. %, 75 wt. %, 80 wt. %, 85 wt. %, 90 wt. %, 95 wt. %, 100 wt. %, or any concentration therein based on the total weight of the core.

In some preferred instances, the organic chelated zinc used in the coating is not included within the core matrix; rather, the organic chelated zinc is contained only on the surface of the core and/or may only partially penetrate the core's surface.

2. Organic Chelated Zinc Containing Coating

In some aspects, the organic chelated zinc in the coating of the coated fertilizer is any organic chelated zinc. Non-limiting examples of organic chelated zinc include Zn-EDTA and/or zinc chelated with nitrilotriacetic acid (NTA), hydroxyethylenediaminetriacetic acid (HOEDTA), diethylenetriaminepentaacetic acid (DTPA), 1,2-diaminocyclohexanetetraacetic acid (DCTA), ethylenediamine di-(o-hydroxyphenylacetic acid) (EDDHA), ethyleneglycol bis (aminoethylether) tetraacetic acid, and/or dihydroxyethyl glycine (DHEG), etc. In some preferred instances, the organic chelated zinc is Zn-EDTA, which can be di-Zn-EDTA (solid di-Zn-EDTA can contain approximately 30 wt. % Zn compared to the weight of the di-Zn-EDTA), mono-Zn-EDTA (solid mono-Zn-EDTA can contain approximately 14.5 wt. % Zn compared to the weight of mono-Zn-EDTA), or salts or combinations thereof. The organic chelated zinc can be added in or as a coating using solid or liquid forms. Liquid forms can include solutions of the organic chelated zinc, such as solutions containing amounts of mono-Zn-EDTA that provide about 9 wt. % Zn compared to the weight of the solution.

The coating can contain or exclude additional ingredients. In some instances the coating optionally contains one or more of one or more colorant(s), water, one or more solubilizing agent(s), one or more binder(s), and/or one or more anticaking agent(s). In some instances, the water contained in the coating can be less than 5% by weight of the coating and be considered a dried or dry coating. In some instances, the water content is less than 4 wt. %, 3 wt. %, 2 wt. %, or 1 wt. % of the weight of the coating. Non-limiting examples of colorants include water based colorants and/or oil based colorants. Colorants can include or can be obtained from chlorophyll, indigo, turmeric, logwood, madder, woad, saffron, tyrian purple, lac, murex snail, octopus ink, cuttlefish ink, catechu, gamboge tree resin, *Himalayan rubhada* root, kamala, larkspur, pomegranate, etc. In some instances, the colorant is indigo and/or turmeric. Non-limiting examples of solubilizing agents include water, sodium carbonate ($Na_2CO_3$), sodium hydroxide (NaOH), potassium hydroxide (KOH), calcium hydroxide ($Ca(OH)_2$), magnesium hydroxide ($Mg(OH)_2$), and/or potassium carbonate ($K_2CO_3$). Non-limiting examples of binders include water, triple super phosphate (TSP), waxes such as paraffin wax, oils such as linseed oils and paraffin oils, flours and starches such as bleached wheat flour, gelatins, polymers, gaur gum, calcium lignosulfonate, plaster of paris, cellulose, gluten, colloidal silica, kaolin, bentonite, polyethylene glycol (PEG), polycaprolactone, low molecular weight polyvinyl acetate, 60 wt. % urea solution, polyacrylamide, polyacrylic acid, polyacrylonitrile, hydroxypropyl methylcellulose (HPMC), biodegradable polylactic acid, and other biodegradable polymeric material such as polylactic acid, poly(3-hydroxypropionic acid), polyvinyl alcohol, poly ε-caprolactone, poly(L-lactide), polybutylene succinate, and biodegradable starch based polymers. Non-limiting examples of anticaking agents include surfactants, amines, liquid carriers such as oil and/or water, and/or a URESOFT® product supplied by Kao Chemicals (Kao Corporation, Japan), such as URESOFT®-125.

The coating can include or exclude a preservative, insecticide, fungicide, fragrance, micronutrient, fertilizer, plant growth agent, nutrient, secondary nutrient, trace element, plant protection agent, filler, colorant, etc., or combination thereof. In some instances, the coating does not contain any additional ingredient. In some instances, the coating does not contain an inorganic zinc, a non-ionized zinc metal, or an acid other than any acid of the organic chelated zinc. Non-limiting examples of micronutrients include magnesium, calcium, zinc, molybdenum, boron, manganese, sulfur, iron, copper, molybdenum, zinc oxide (ZnO), boric oxide ($B_2O_3$), triple superphosphate (TSP), and/or magnesium oxide (MgO). In some instances, the micronutrients may be present in the form of inorganic salts. Examples of plant protection agents include, but are not limited to, insecticides, fungicides, growth regulators, nitrification inhibitors, and any mixtures thereof. Examples of fillers include, but are not limited to, clay, peat, etc. Examples of other fertilizer ingredients are for example described in Ullmann's Encyclopedia of Industrial Chemistry, $5^{th}$ edition, 1987, Volume A10, pages 363 to 401, DE-A-41 28 828, DE-A-19 05 834, or DE-A-196 31 764, which are hereby incorporated by reference.

It is contemplated that the coated fertilizer of the present invention can contain a coating in any amount, volume, thickness, coverage of the fertilizer core surface, etc. In some instances, the coating is 0.001 wt. % to 10 wt. %, 0.001 wt. % to 9 wt. %, 0.001 wt. % to 8 wt. %, 0.001 wt. % to 7 wt. %, 0.001 wt. % to 6 wt. %, 0.01 wt. % to 10 wt. %, 0.1 wt. % to 10 wt. %, 0.5 wt. % to 10 wt. %, 0.5 wt. % to 9 wt. %, 0.5 wt. % to 8 wt. %, 0.5 wt. % to 7 wt. %, 0.5 wt. % to 6 wt. %, 1 wt. % to 6 wt. %, or any range therein, of the coated fertilizer based on the total weight of the coated fertilizer, or any range therein. In some aspects, at least a portion of the fertilizer core's surface can be in direct contact with the coating. In some instances, the coating is not dispersed throughout the fertilizer core. In some instances, the coating forms a shell at least partially coating the core. In some instances, the organic chelated zinc coating is continuous or substantially continuous. In some instances, the organic chelated zinc coating is a powder coating. In some instances, the organic chelated zinc coating is formed by dispersed droplets that may partially or may not form a continuous coating. The coating can coat at least 55%, 60%, 65%, 70%, 75%, 80%, 85%, 90%, 95%, or 100% or more of the surface of the core. In some instances, the coating has a mean average thickness of 2 to 350 microns, 2 to 50 microns, 2 to 40 microns, 5 to 50 microns, 5 to 40 microns, 10 to 50 microns, 10 to 40 microns, 50 to 350 microns, 60 to 350 microns, 70 to 350 microns, 80 to 350 microns, 90 to 350 microns, 100 to 350 microns, 120 to 350 microns, 50 to 300 microns, 50 to 250 microns, 50 to 200 microns, 80 to 300 microns, 90 to 300 microns, 100 to 300 microns, 80 to 200 microns, 90 to 200 microns, 100 to 200 microns, or any range or size therein.

The coated fertilizer can contain one or more than one coating. In some instances, the coated fertilizer contains only one coating. In some instances, the coated fertilizer contains only two coatings. In some instances, the coated fertilizer contains more than two coatings. The coated fertilizer can contain a coating between the fertilizer core surface and the organic chelated zinc coating. In some instances, the coated fertilizer contains an oil coating between the fertilizer core surface and the organic chelated zinc coating.

3. Amounts of Ingredients of the Coated Fertilizer of the Present Invention

It is contemplated that the compositions of the present invention can include any amount of the ingredients discussed in this specification. The compositions can also include any number of combinations of additional ingredients described throughout this specification. The concentrations of any ingredient within the compositions can vary. In non-limiting embodiments, for example, the compositions can comprise, consisting essentially of, or consist of, in their final form, for example, at least about 0.0001%, 0.0010%, 0.0020%, 0.0030%, 0.0040%, 0.0050%, 0.0060%, 0.0070%, 0.0080%, 0.0090%, 0.0100%, 0.0200%, 0.0300%, 0.0400%, 0.0500%, 0.0600%, 0.0700%, 0.0800%, 0.0900%, 0.1000%, 0.2000%, 0.3000%, 0.4000%, 0.5000%, 0.6000%, 0.7000%, 0.8000%, 0.9000%, 1.0%, 2.0%, 3.0%, 4.0%, 5.0%, 6.0%, 7.0%, 8.0%, 9.0%, 10%, 20%, 30%, 35%, 40%, 45%, 50%, 60%, 65%, 70%, 75%, 80%, 85%, 90%, 95%, 99%, 100%, or any range or concentration derivable therein, of at least one of the ingredients that are mentioned throughout the specification and claims. In non-limiting aspects, the percentage can be calculated by weight or volume of the total composition. A person of ordinary skill in the art would understand that the concentrations can vary depending on the addition, substitution, and/or subtraction of ingredients in a given composition.

3. Blended or Compounded Fertilizers

The coated fertilizer of the present invention can be included with other fertilizers in a fertilizer composition. In some instances, the coated fertilizer is contained in a blended fertilizer composition or a compounded fertilizer. Additional fertilizers can be chosen based on the particular needs of certain types of soil, climate, or other growing conditions to maximize the efficacy of the blended composition in enhancing plant growth and crop yield. The coated fertilizers herein can be blended with other fertilizer at any concentration. In some instances, the desired concentration is sufficient to meet the required nutrient or micronutrient content in the blend. By way of example, a blended fertilizer composition of the present invention can be formulated into a quick release fertilizer. Alternatively, the blended fertilizer composition can be formulated into a slow-release fertilizer. In some instances, the blended fertilizer composition is formulated into a specialty fertilizer.

B. Method of Making the Coated Fertilizer

With reference to FIG. 1, a non-limiting method (100) of making a coated fertilizer can include obtaining a fertilizer core, an organic chelated zinc, and optionally additives (101). In some instances, the organic chelated zinc and optional additives are mixed (102) to form a coating composition. One or more of the ingredients mixed can be heated during mixing or pre-heated before mixing. In some instances, the ingredients are heated to room temperature or up to 90° C. or more. If additional ingredients are included, the additional ingredients can be added at any time in the production of the coated fertilizer and/or can be added after the coated fertilizer is formed. Mixing can be performed by processes such as stirring, vortexing, homogenizing, shaking, pouring, etc.

The method (100) can include a step (103) for coating the fertilizer core with the organic chelated zinc, and/or coating composition. The organic chelated zinc or coating composition can be applied to the core by a variety of methods, such as spraying, pouring, mixing, blending, etc. A fluid bed sprayer or coater, a liquid spray mixer, a rotating drum or pan, spray coating at discharge point, a paddle mixer, etc. can be used. In one non-limiting instance, the equipment and methods used in the Examples can be used. In some instances, a coating is applied onto the fertilizer core before the organic chelated zinc or coating composition is applied to the core.

In some instances, optionally, the organic chelated zinc, and/or coating composition is dried in a drying step (104) on the fertilizer core to form a dry coating on the fertilizer core. The coated fertilizer can be dried by any means known, including exposure to ambient air, heated sweep gas, unheated sweep gas, heat, etc. If more than one layer is desired, the coated core can then be coated with a second, third, fourth, or more layers of organic chelated zinc, and/or coating composition before or after the first coating dries on the core (not shown). For each layer, the amount of time used to apply the coating can be an amount sufficient to ensure that a substantially even layer is formed on the core and/or formed on the subsequent layer. In some instances, the application times can include 5 minutes, 10 minutes, 30 minutes, 1, hour, 2 hours, 3 hours, 4 hours, 5 hours, or more or any range therein (e.g., 5 minutes to 5 hours, 5 minutes to 1 hour, etc.). In some instances, the ingredients are heated to room temperature or up to 90° C. or more.

The method (100) can include optionally combining additional fertilizers with the coated fertilizer to form a blended or compounded fertilizer (105). Combining can be performed by any type of blending or mixing apparatus generally available in the art (e.g., WJ-700, WJ-900, or WJ-1000 Mixing Machines from Whirlston Machinery (Zhengzhou, China). Once combined, the fertilizer blend can be stored for future use or sale.

Figure 2:
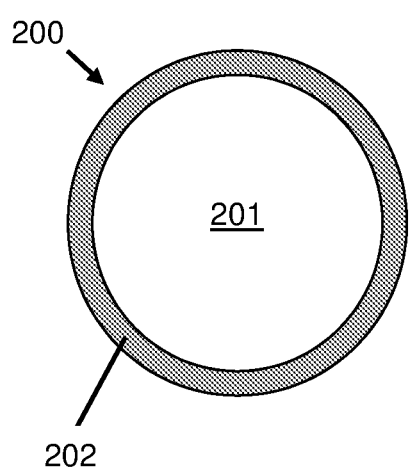
FIG. 2 is a non-limiting representation of a cross-section of a fertilizer core coated by an organic chelated zinc containing coating of the present invention.

Referring to FIG. 2, the produced coated fertilizer (200) can include a fertilizer core (201) and an organic chelated zinc coating (202). In this embodiment, the coating (202) is on the outer surface of the core (201) and is not present or distributed throughout the core's (201) matrix/internal volume. However, due to the porosity of some fertilizer cores, it is contemplated that some of the organic chelated zinc coating or components thereof (such as solvents) may penetrate into the matrix/internal volume of the fertilizer core. Further, the coating (202) covers the entire outer surface area of the core 201 in FIG. 2. However, and not shown, the coating (202) can cover less than 100% of the outer surface area of the core (201) (e.g., 10%, 20%, 30%, 40%, 50%, 60%, 70%, 80%, 90%, 95%, or 99% of the outer surface area of the core (201) can be coated with the coating (202), or any range therein). In some instances, the organic chelated zinc coating is not continuous (not shown). In some instances, the organic chelated zinc coating is a powder coating. In some instances, the organic chelated zinc coating is formed by dispersed droplets that may partially or may not form a continuous coating (not shown). Additionally, and although not shown, it is contemplated in the context of the present invention to also include a coating between the surface of the core (201) and the organic chelated zinc coating (202).

The coated fertilizer can be produced in a batch or continuous process. In some instances, the coated fertilizer is produced on an industrial scale. In some instances, the coated fertilizer is produced at 1 kg/hour, or less, up to 10,000 kg/hour, or more.

C. Use of the Fertilizer Compositions

In some instances, the coated fertilizer of the present invention can be used as a fertilizer. The coated fertilizer can be used alone, in a combined fertilizer blends, or with additional separate fertilizers. The coated fertilizer can be used in a method of fertilizing. The method can include applying a fertilizer composition to at least one of a soil, an organism, a liquid carrier, a liquid solvent, or a combination thereof.

Non-limiting examples of plants that can benefit from the fertilizer of the present invention include vines, trees, shrubs, stalked plants, ferns, etc. The plants may include orchard crops, ornamental plants, food crops, timber, and harvested plants. The plants may include Gymnosperms, Angiosperms, and/or Pteridophytes.

EXAMPLES

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results.

Example 1

Production of Fertilizer Coated with Organic Chelated Zinc

Described below are non-limiting examples of production of an organic chelated zinc containing coating on a fertilizer core. Fertilizer cores of urea were coated with coatings that contained mono-Zn-EDTA or di-Zn-EDTA using powdered Zn-EDTA (with or without a binder), a water based suspension or solution of Zn-EDTA, or an oil based suspension of Zn-EDTA. The Zn-EDTAs used were obtained from AkzoNobel™ and Geolife™. The coatings were applied as either powder coatings or liquid coatings. See Table 1 for the coating formulations prepared for analysis in the Examples. The coating formulations were prepared as described below using either a fluid bed coater using a water based coating composition, a drum coater using a water based coating composition, a drum coater using dry Zn-EDTA powder, or a drum coater using an oil based coating composition.

Fluid Bed Coating

Briefly, a fluid bed granulator with Human Machine Interface (HMI) controller (Bosch, Solidlab) was used to produce lab scale batches of coated fertilizers. The granulator was run using the Manual mode of operation for optimization of the process. The operation involved five major steps in sequence, specifically, material charging, material heating, coating process, drying, and finally, product discharge.

Material Charging: Air flow to the fluid bed granulator was set to approximately 225 m$^3$/hr, a temperature of 55° C. to 70° C., spray air pressure was approximately 3 bar. Granulated urea (about 1.5 kg with an average diameter of 2 to 4 mm) was charged through the charging port available at the bottom of the granulator. The port was closed once material feeding was completed.

Material Heating: The drying mode on the process step page on the user interface was selected for drying. The air volume was set at 225 m$^3$/hr and the temperature was set to 60° C. The material was heated for 20 minutes.

Coating: Several Zn-EDTA solutions or suspensions for coating were prepared or obtained for coating. Solid materials (powder) and suspensions were obtained from commercial sources either in liquid or solid (powder) forms. Solid mono-Zn-EDTA or di-Zn-EDTA was mixed with water and stirred using a shaker/homogenizer to prepare a uniform suspension before coating. The suspensions were prepared for with Zn-EDTA to water ratios of 1:0.25 to 1:6. Coating with mono-Zn-EDTA or di-Zn-EDTA aqueous suspensions were found to produce a sticky surface at some concentrations. Diluting to at least 1:2 mono-Zn-EDTA to water, at least 1:5 mono-Zn-EDTA to water, and/or pausing the application of the suspension to allow the coating to dry decreased the stickiness of the coated fertilizers. Mono-Zn-EDTAs or di-Zn-EDTAs that were obtained from commercial suppliers as suspensions were not modified before use in coating the fertilizer core.

The Zn-EDTA containing suspensions were stirred at 250 RPM for 20 minutes before the coating process to homogenize the suspensions. The suspensions were pumped through a peristatic pump. The peristatic pump contained two heads connected by piping to two spray nozzles that were located at the bottom portion of the fluid bed granulator. The rate of pumping was between 8 to 10 mL/min and the coating air flow was set for 250 m$^3$/hr to 375 m$^3$/hr. A filter cage assembly (five filters) located at the top served as a filter to avoid flow of any bigger particles/granules. The entire process continued until the coating material was dispersed onto the fertilizer cores.

Drying: After coating was completed, the drying mode was turned on to dry the product. The air volume was set to 280 m$^3$/hr to 300 m$^3$/hr and the air temperature was set to 60° C. to 65° C. Periodic sampling was done from the sample port to check for moisture content. The coated fertilizers were dried for 10 to 15 minutes.

Discharge: After product drying, the product was collected by opening the charging port and discharging the coated fertilizer.

Drum Coating

Using a drum coater, a series of experiments were carried out to coat the fertilizer core with a water based liquid coating, a powder coating (with or without binder), or an oil based liquid suspension coating. Zn-EDTA was obtained from commercial sources in liquid or solid (powder) forms to prepare the coatings.

The coated fertilizers were produced at lab scale on a drum coater with a capacity of 200 gram to 2 kilograms. The drum contained four baffles, 0.5 inch in height and 1 inch in width, across the drum length. The baffles are placed at 45° angles from the center of the drum with no angled trajectory from the surface of the drum (perpendicular to the surface of the drum). The drum coater system was run using a manual mode. Production of the coated fertilizers included the major steps of feeding, heating, purging, exhausting, pumping flow rate, drying, and discharge of the coated material.

Liquid Coating: For producing coated fertilizers using a liquid coating composition, Zn-EDTA powder was dissolved in water. Sieved (between 1.00 mm and 4.00 mm in diameter) granular urea was weighed and fed into the drum. The surface of the urea granules was warmed using fluidizing hot air to improve the adherence of the coating material. The liquid coating material was pumped using a peristatic pump and 70° C. fluidizing compressed air into an atomizing orifice spray nozzle to coat the fertilizer core in the drum. The coating material was sprayed at a rate of 8 ml/ml using an air pressure of 3 bar. The spray nozzle had a diameter of 5 mm and contained 6 openings for spraying. The spray nozzle was located 500 mm from the surface of the drum bed. The drum was rotated at 20 RPM during the coating and drying steps. An exhaust pipe line was placed on top of the drum to remove the compressed air used to spray the coating material. A simple digital controller controlled the temperature of hot air used in the drum. The coated fertilizers were then dried for 20 to 30 minutes while the drum continued to rotate. Once the coated urea granules were dry, the coated fertilizer was collected.

Dry Powder Coating: Dry powder coatings can be influenced by particle size. Micro fine ground Zn-EDTA particles with diameters of more than 20 to 100 microns were used to powder coat the urea granules. The surface of the urea granules were warmed as described above using fluidizing hot air to improve the adherence of the coating material.

The micro fine zinc powder was sprayed using a manual gun sprayer. After complete addition of the coating powder, the drum was rotated for 20 min to ensure uniform distribution of powder. Once coated, the rotation of the drum was stopped and the coated fertilizers were collected.

Oil Based Powder Coating: A similar protocol was used for oil based powder coatings as described for the liquid coating process above. Different oils were used with different ratios of oil to Zn-EDTA. The oils used included linseed oil, castor oil, palm oil, mustard oil, paraffin oil, and rapeseed oil. In some instances, linseed oil was preferred. The oil acted as binder/surfactant. Due to the water-solubility of urea and the hydrophilic nature of oil due to its non-polar property, absorption of water can be avoided or decreased when an oil based coating is used. The oil used was optimized for uniform distribution over the urea granules and for the type of Zn-EDTA used.

Different ratios of Zn-EDTA to oil were tested from 1:0.5 to 1:2. Mono-Zn-EDTA materials are amorphous in nature and appeared to work better with slightly higher amounts of oil than di-Zn-EDTA. Di-Zn-EDTA was fluffy in nature, and adhered to the urea granules with less oil usage. The optimized concentrations of Zn-EDTA to oil were 1:1.5 for mono-Zn-EDTA and 1:1.3 for di-Zn-EDTA.

To produce the coated fertilizer, similar conditions as described above for the liquid coating were used. Oil was weighed and sprayed on the urea core drop by drop using a 10 ml syringe. The oil coated fertilizer cores were then rotated in the drum for 15 minutes to ensure the uniform dispersion of oil. Zn-EDTA powder was then sprayed using a manual gun sprayer into the drum. The drum was rotated for another 20 minutes to ensure uniform distribution of the powder. The drum was then stopped and the coated fertilizers collected.

TABLE 1

(Coating Formulations Prepared)

| Coating Type | Zn Source | Zn Source per kg of urea (g) | Water or oil per kg of urea (g) |
|---|---|---|---|
| Water based | mono-Zn-EDTA | 3.50 | 3.5 |
| Water based | di-Zn-EDTA | 1.70 | 4.5 |
| Oil based | mono-Zn-EDTA | 3.5 | 5 |
| Oil based | di-Zn-EDTA | 1.70 | 2.3 |
| Powder | mono-Zn-EDTA | 3.5 | — |
| Powder | di-Zn-EDTA | 1.70 | — |

The water content of the water based coating types were the same for both the fluidized bed coater and drum coater coated formulations. Further, the following two additional water based coatings were prepared, but not tested in Example 2 below: a mono-ZN-EDTA coating using 3.50 g Zn Source per kg of urea and 5 g of water; and di-ZN-EDTA coating using 1.70 g Zn Source per kg of urea and 8 g of water.

Example 2

Characterization of Urea Fertilizer Coated with Organic Chelated Zinc

Coated fertilizers of Table 1 and uncoated urea granules (control) were evaluated for moisture content, weight loss due to abrasion, crush strength, and bulk density. All of the physical property measurements were performed using standard protocols (e.g., from fertilizer manuals) and described briefly in the following sections. Values are shown in Table 2.

Crush Strength: Crush strength was measured using a Chatillon CS225 crush strength analyzer (Ametek, USA). Briefly, twenty coated urea granules from each formulation ranging in size from 2 to 4 mm were tested for crush strength. Each granule was placed on a platform (immobile phase) and the load cell (mobile phase) was adjusted to move downward at a speed of 10 mm/min. The load cell applied force on the granule until a sharp initial crack on the granule surface was formed. The maximum load applied to make the initial crack was recorded as the crushing strength. The average crush strength of the twenty granules tested for each formula was considered the crush strength of the formula.

It was shown that the formulations had an acceptable crush strength (>2 kgf/granule). See Table 2.

Attrition: Attrition (weight loss due to abrasion) is an indication of good adhesion of coating material on the fertilizer core. The analysis was performed using a Copley, FRV 2000 model (Copley Scientific, UK). Briefly, a 100 cm$^3$ portion of sieved granules ranging in size of 2 to 4 mm was weighed (W1) and placed into a test drum along with 100 g of stainless steel balls (50 Nos). The drum was closed and rotated for 10 min at 30 rpm. Then, the steel balls were separated from the sample and the material was screened through a 1 mm sieve using an electromagnetic sieve shaker. The material that did not pass through the sieve (granules over 1 mm) was weighed (W2). Results were calculated in terms of % weight loss due to attrition by dividing the weight of the material lost (W1-W2) by W1 and multiplying by 100:

$$\text{Weight loss (wt. \%)} = \frac{W1 - W2}{W1} \times 100$$

It was determined that the coated urea granules had an acceptable attrition value of less than 0.3%, indicating good adhesion of the coating material on the fertilizer core. See Table 2.

Moisture Analysis: Moisture content in the formulations were measured using Mettler Toledo halogen moisture analyzer, model HB43-S. Briefly, percentage of water in a sample (moisture content or MC) in weight percent was measured by comparing the weight of the sample prior to drying(A) in the assay with the weight of the sample after being dried to a constant weight (B) using the following formula:

$$MC\ (\text{Wt \%}) = \left(\frac{(A-B)}{A}\right) * 100$$

It was determined that all of the coated urea granules had an acceptable moisture content. See Table 2.

Bulk Density: Bulk density was determined by measuring the weight of 100 ml of sieved coated urea granules having a size range of 2 to 4 mm. Bulk density was calculated by dividing the weight of the sample by the volume of the sample as follows:

$$\text{Bulk density} = \frac{\text{weight recorded by the sample}}{\text{known volume of the sample}} \left(\frac{g}{cm3}\right)$$

It was determined that the coated urea granules had a bulk density around the target density. See Table 2.

TABLE 2

(Physical Properties of Coated Urea of Table 1 and Uncoated Urea (Control))

| Coating Type | Zn Source | Moisture (wt. %) | Attrition (wt. %) | Crush Strength (kgf/granule) | Bulk Density, Loose (g/cm³) |
|---|---|---|---|---|---|
| Water based | mono-Zn-EDTA | 0.64 | 0.074 ± 0.033 | 2.38 ± 0.37 | 0.745 ± 0.005 |
| Water based | di-Zn-EDTA | 0.56 | 0.083 ± 0.000 | 2.34 ± 0.89 | 0.723 ± 0.002 |
| Oil based | mono-Zn-EDTA | 0.57 | 0.068 ± 0.041 | 2.80 ± 0.66 | 0.73 ± 0.005 |
| Oil based | di-Zn-EDTA | 0.52 | 0.113 ± 0.059 | 2.58 ± 0.56 | 0.74 ± 0.005 |
| Powder | mono-Zn-EDTA |  | 0.03 | 2.99 | 0.73 |
| Powder | di-Zn-EDTA |  | 0.03 | 2.80 | 0.74 |
| Uncoated Urea Control | | | | | |
| None | None | 0.51 | 0.064 ± 0.008 | 2.96 ± 0.36 | 0.69 ± 0.006 |
| Target Values | | | | | |
| | | <1 | <0.3 | Min. 2 | 0.65 |

Samples 1 and 2, the water based coating type coated formulations, of Table 2 were produced by use of the drum coater method. Fluidized bed coater produced water based coating type coated formulations had similar test results to Samples 1 and 2 of Table 2 (data not shown).

The invention claimed is:

1. A coated fertilizer comprising:
a fertilizer core comprising a urea-based fertilizer; and
a coating comprising an organic chelated zinc that covers at least a portion of a surface of the fertilizer core,
wherein the coated fertilizer comprises 0.02 wt. % to 0.5 wt. % of zinc from the organic chelated zinc relative to total weight of the coated fertilizer,
wherein the coating comprising an organic chelated zinc comprises one or more binders having a weight ratio of the one or more binder to the organic chelated zinc of 1:1 to 2:1; and
wherein:
i) an oil based coating is at least partially positioned between the surface of the fertilizer core and the coating comprising an organic chelated zinc; and/or
ii) the coating comprising an organic chelated zinc is a powder coating comprising organic chelated zinc particles with a mean average diameter of 10 to 350 microns.

2. The coated fertilizer of claim 1, wherein the coated fertilizer comprises a colorant within the coating comprising an organic chelated zinc.

3. The coated fertilizer of claim 2, wherein the colorant is one or more of or can be obtained from one or more of chlorophyll, indigo, turmeric, logwood, madder, woad, saffron, tyrian purple, lac, murex snail, octopus ink, cuttlefish ink, catechu, gamboge tree resin, *Himalayan rubhada* root, kamala, larkspur, and pomegranate.

4. The coated fertilizer of claim 1, wherein the fertilizer core comprises 50 wt. % or more of a urea-based fertilizer relative to the total weight of the coated fertilizer.

5. The coated fertilizer of claim 1, wherein the fertilizer core consists of a urea-based fertilizer.

6. The coated fertilizer of claim 1, wherein the urea-based fertilizer is urea.

7. The coated fertilizer of claim 1, wherein the coating comprising an organic chelated zinc is in direct contact with the portion of the surface of the fertilizer core.

8. The coated fertilizer of claim 1, wherein the oil based coating is at least partially positioned between the surface of the fertilizer core and the coating comprising an organic chelated zinc.

9. The coated fertilizer of claim 8, wherein the oil based coating comprises linseed oil, castor oil, palm oil, mustard oil, paraffin oil, rapeseed oil, cottonseed oil, a vegetable oil, or combinations thereof.

10. The coated fertilizer of claim 1, wherein the coating comprising an organic chelated zinc is a powder coating comprising organic chelated zinc particles with a mean average diameter of 10 to 350 microns.

11. The coated fertilizer of claim 1, wherein the coating comprising an organic chelated zinc is a dried coating.

12. The coated fertilizer of claim 1, wherein the weight ratio of the one or more binder to the organic chelated zinc is 1:1 to 3:2.

13. The coated fertilizer of claim 1, wherein the binder comprises an aqueous binder, and oil, and/or a solid additive.

14. The coated fertilizer of claim 1, wherein the coated fertilizer comprises 0.02 wt. % to 0.20 wt. % of zinc from the organic chelated zinc relative to the total weight of the coated fertilizer.

15. The coated fertilizer of claim 1, wherein the organic chelated zinc is zinc chelated to an acid.

16. The coated fertilizer of claim 1, wherein the coated fertilizer does not include inorganic zinc, non-ionized zinc metal, or an acid.

17. A fertilizer blend or a compounded fertilizer comprising the coated fertilizer of claim 1 and an additional fertilizer.

18. A method for producing a coated fertilizer of claim 1, the method comprising contacting a urea-based fertilizer core with:
- an organic chelated zinc coating composition comprising an organic chelated zinc and an aqueous liquid carrier under conditions sufficient to form a coating comprising the organic chelated zinc that is at least partially covering a surface of the fertilizer core; or
- an oil based coating composition under conditions sufficient to form an oil based coating that is at least partially covering a surface of the fertilizer core and thereafter contacting the oil based coating with an organic chelated zinc coating composition comprising an organic chelated zinc under conditions sufficient to form a coating comprising the organic zinc that is at least partially covering a surface of the oil based coating.

19. A method of fertilizing, the method comprising applying the coated fertilizer of claim 1 to at least one of a soil, a crop, or a soil and a crop.

* * * * *